United States Patent
Gu

(10) Patent No.: US 11,844,449 B2
(45) Date of Patent: Dec. 19, 2023

(54) MULTI-FUNCTION FIXING KIT

(71) Applicant: Shenzhen Reekoos Houseware Co., Ltd., Shenzhen (CN)

(72) Inventor: Weiliang Gu, Shenzhen (CN)

( * ) Notice: Subject to any disclaimer, the term of this patent is extended or adjusted under 35 U.S.C. 154(b) by 7 days.

(21) Appl. No.: 17/335,183

(22) Filed: Jun. 1, 2021

(65) Prior Publication Data
US 2022/0378235 A1    Dec. 1, 2022

(51) Int. Cl.
*A47G 23/02* (2006.01)
*B65D 81/38* (2006.01)

(52) U.S. Cl.
CPC ..... *A47G 23/0266* (2013.01); *A47G 23/0216* (2013.01); *A47G 23/0241* (2013.01); *B65D 81/3876* (2013.01); *A47G 2023/0275* (2013.01); *A47J 2201/00* (2013.01); *F25D 2331/803* (2013.01); *F25D 2331/805* (2013.01); *F25D 2331/809* (2013.01)

(58) Field of Classification Search
CPC ............ A47G 23/0241; A47G 23/0266; A47G 2023/0275; B65D 81/3876; F25D 2331/803; F25D 2331/805; F25D 2331/809; F25D 31/007; A47J 2201/00
See application file for complete search history.

(56) References Cited

U.S. PATENT DOCUMENTS

| | | | | |
|---|---|---|---|---|
| 2,963,256 A * | 12/1960 | Borah | ............... | A47G 23/0225 248/314 |
| 4,989,415 A * | 2/1991 | Lombness | ............. | F25D 31/007 62/372 |
| 5,212,963 A * | 5/1993 | McGinnis | ............. | F25D 31/007 62/530 |
| 10,005,608 B1 * | 6/2018 | Jacob | ................ | B65D 81/3881 |
| 10,791,858 B2 * | 10/2020 | Robertson | .......... | B65D 43/0229 |
| 10,835,067 B2 * | 11/2020 | Rane | .................. | A47G 23/0266 |
| 11,040,819 B1 * | 6/2021 | Frankcomb | ........ | A47G 23/0216 |
| 2011/0114656 A1 * | 5/2011 | Tupy | .................... | A47G 23/0241 220/729 |
| 2021/0289967 A1 * | 9/2021 | Merritt | ............... | A47G 23/0266 |
| 2022/0177217 A1 * | 6/2022 | Gu | ..................... | B65D 81/3876 |

\* cited by examiner

*Primary Examiner* — John K Fristoe, Jr.
*Assistant Examiner* — Jennifer Castriotta
(74) *Attorney, Agent, or Firm* — Daniel M. Cohn; Howard M. Cohn

(57) ABSTRACT

A multi-function fixing kit comprises a stacking insert main body and a retaining ring main body. The retaining ring main body can be removably connected with a storage container. The stacking insert main body can be placed in the storage container. The stacking insert main body is divided into a first layer structure, a second layer structure and a third layer structure from top to bottom to fix various types of beverage containers. A top of the first layer structure can be removably connected with a 12 oz beverage can main body, a top of the second layer structure can be removably connected with a 12 oz beer bottle main body, and a top of the third layer structure can be removably connected with a 12 oz slim beverage can main body. A top of a placing device can be removably connected with a 16 oz beverage can.

5 Claims, 7 Drawing Sheets

MULTI-FUNCTION FIXING KIT

TECHNICAL FIELD

The present utility model relates to the field of beverage container fixing, in particular to a multi-function fixing kit.

BACKGROUND

With the arrival of summer, people need to thermally insulate beverage. There are storage containers for short-time thermal insulation of single beverage container in the market. Such storage container for thermal insulation is used to prevent temperature diffusion to the stored beverage container. However, gaskets in some existing storage containers have single structure and function, so the storage containers using such gaskets can only store beverage containers of a single size. If the beverage containers of other sizes are to be stored, the storage containers of different sizes need to be used, which leads to inconvenient use and high cost for users. Therefore, a person skilled in the art provides a multi-function fixing kit to solve the problem in the background art.

SUMMARY

In order to solve the problem of beverage containers of different sizes, the present utility model aims to provide a multi-function fixing kit to solve the problem in the above background art.

To achieve the above purpose, the present utility model provides the following technical solution: a multi-function fixing kit, comprises a stacking insert main body and a retaining ring main body, a diameter of the retaining ring main body is 80.5 mm, a top of the retaining ring main body is provided with a through hole with a diameter of 56.5 mm, a bottom of the retaining ring main body can be movably connected with a storage container, the stacking insert can be embedded with a storage container, the stacking insert main body is divided into a first layer structure, a second layer structure and a third layer structure from top to bottom, a top of the first layer structure is removably connectable with a 12 oz beverage can main body, a top of the second layer structure is removably connectable with a 12 oz beer bottle main body, a top of the third layer structure is removably connectable with a 12 oz slim beverage can main body, and a top of the storage container is movably connected with a 16 oz beverage can.

As a preferred technical solution of the present utility model, the top of the retaining ring main body is provided with a through hole, the retaining ring main body is made of a buffer rubber elastic material, and the top of the retaining ring main body is an arc structure.

As a preferred technical solution of the present utility model, the retaining ring main body is provided with a fixing groove inside, and the bottom of the retaining ring main body is movably linked with a storage container.

As a preferred technical solution of the present utility model, diameter of the first layer structure is 66 mm, a diameter of the second layer structure is 62 mm, and a diameter of the third layer structure is 58 mm.

As a preferred technical solution of the present utility model, the stacking insert main body is made of an insulative material, and the bottom of the stacking insert main body is an arc structure.

Compared with the prior art, the present utility model has the following beneficial effects: different from the prior art, the present utility model has a reasonable structure, convenient use and simple operation, and can enable a user to understand the working principle in a simple and clear way.

As shown in FIGS. 1 and 2, by rotating and fixing the retaining ring main body and the storage container, the retaining ring main body is made of an elastic buffer material, which is adaptable to bottles of different sizes, so that the through hole can be in better contact with the beverage container, thus playing a role in fixing the top of the beverage container.

As shown in FIGS. 3, 4, 5, 6 and 7, by dividing the stacking insert main body into a multi-layer structure, the stacking insert is an insulative material plate, which plays better temperature control, and the structure size decreases, so that the gasket main body can be applied to beverage containers of different sizes to fix bottoms thereof, and the stacking insert can be taken out, which is convenient for replacement, saves production cost, and facilitates use.

Figure 1:
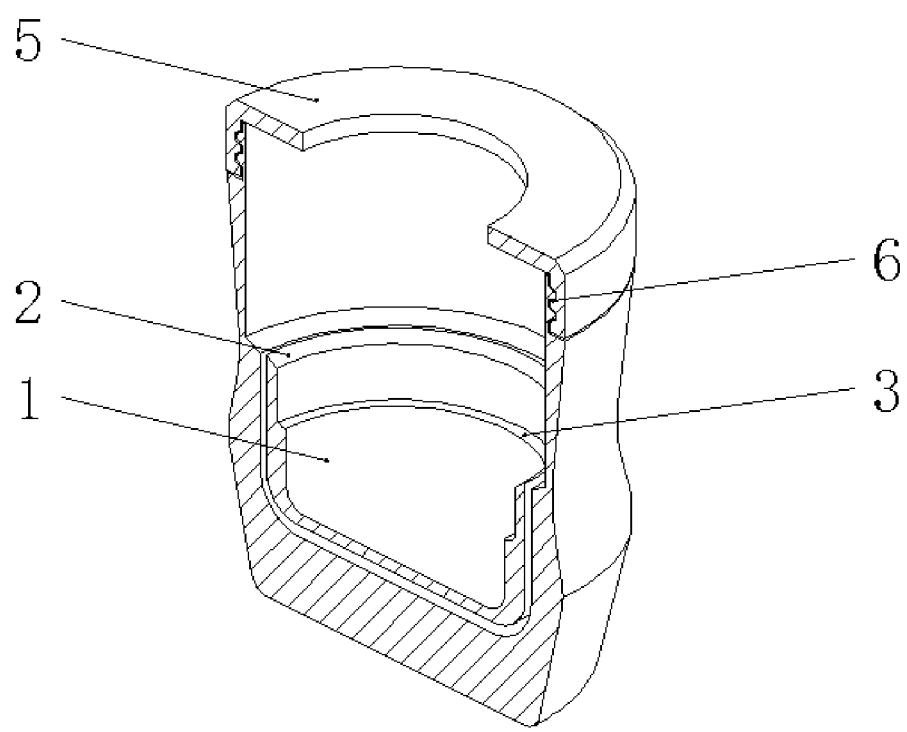
FIG. 1 is a mounting section view of a main structure of a multi-function fixing kit of the present utility model.

Reference numerals in the figures: 1. stacking insert main body; 2. first layer structure; 3. second layer structure; 4. third layer structure; 5. retaining ring main body; 6. fixing groove; 7. 12 oz beverage can main body; 8. 12 oz slim beverage can main body; 9. 12 oz beer bottle main body; and 10. 16 oz beverage can.

DETAILED DESCRIPTION OF EMBODIMENTS

The technical solutions in the embodiments of the present utility model will be described clearly and completely in connection with the drawings in the embodiments of the present utility model in the following paragraphs. Obviously, the embodiments described are only some, not all, of the embodiments of the present utility model. Based on the embodiments of the present utility model, all other embodiments obtained by those of ordinary skill in the art without creative work fall within the scope of protection of the present utility model.

Figure 2:
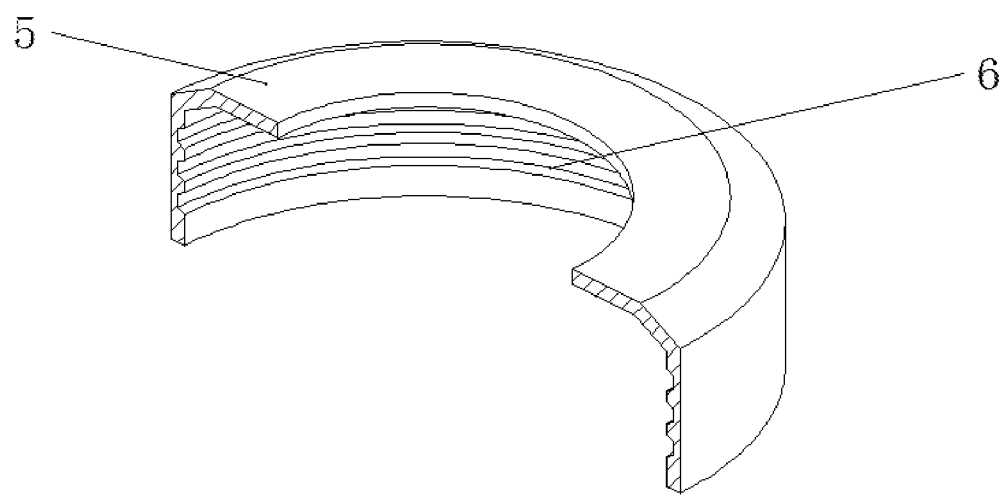
FIG. 2 is a structural section view of a retaining ring main body of the multi-function fixing kit of the present utility model.
Figure 3:
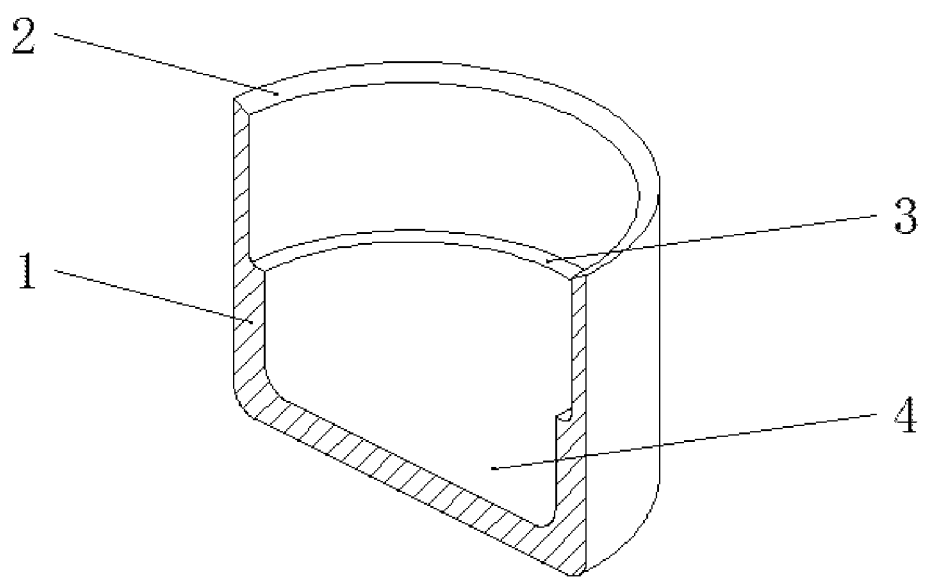
FIG. 3 is a structural section view of a stacking insert main body of the multi-function fixing kit of the present utility model.
Figure 4:
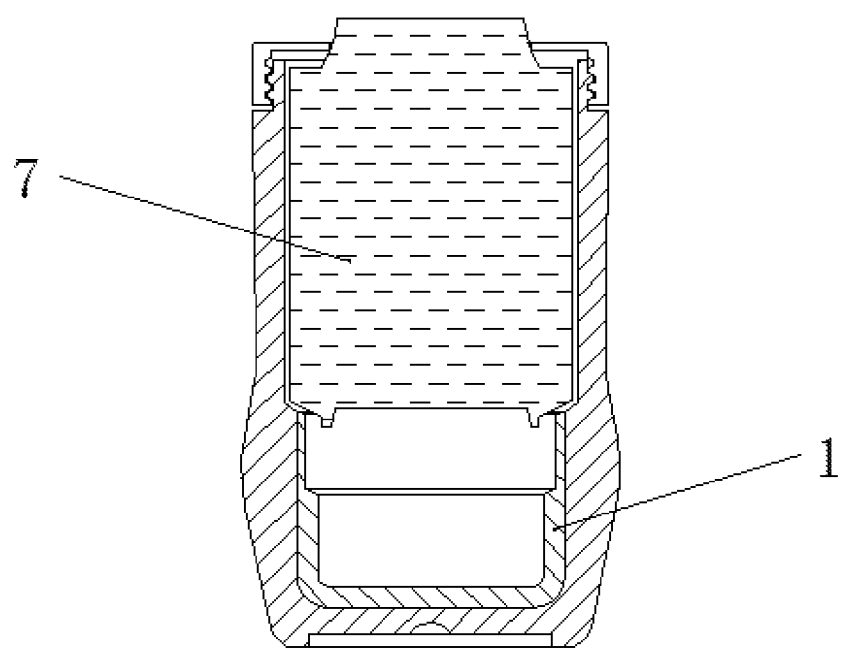
FIG. 4 is a section view of a 12 oz beverage can main body placement structure of the multi-function fixing kit of the present utility model.
Figure 5:
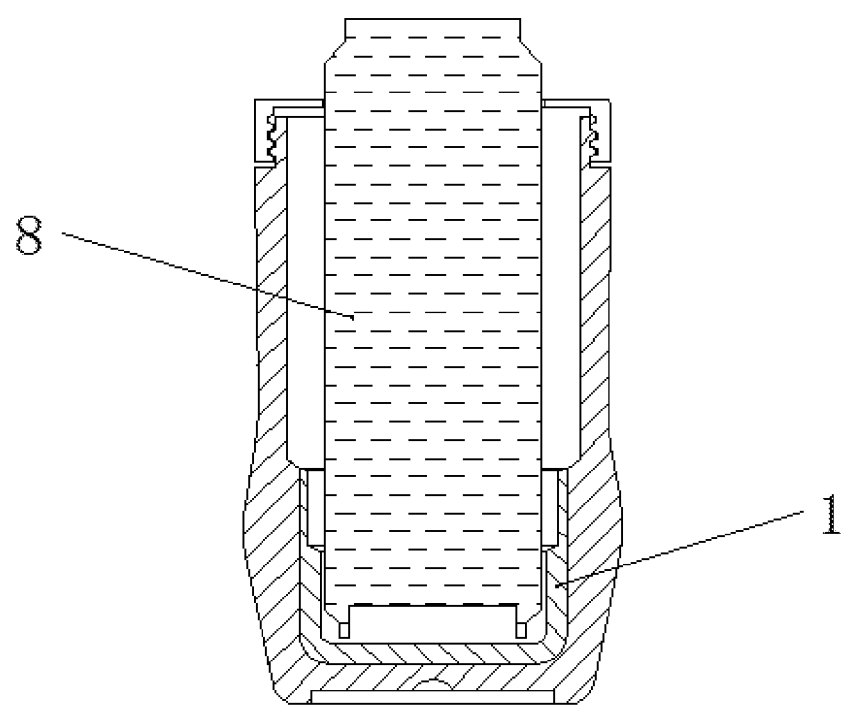
FIG. 5 is a section view of a 12 oz slim beverage can main body placement structure of the multi-function fixing kit of the present utility model.
Figure 6:
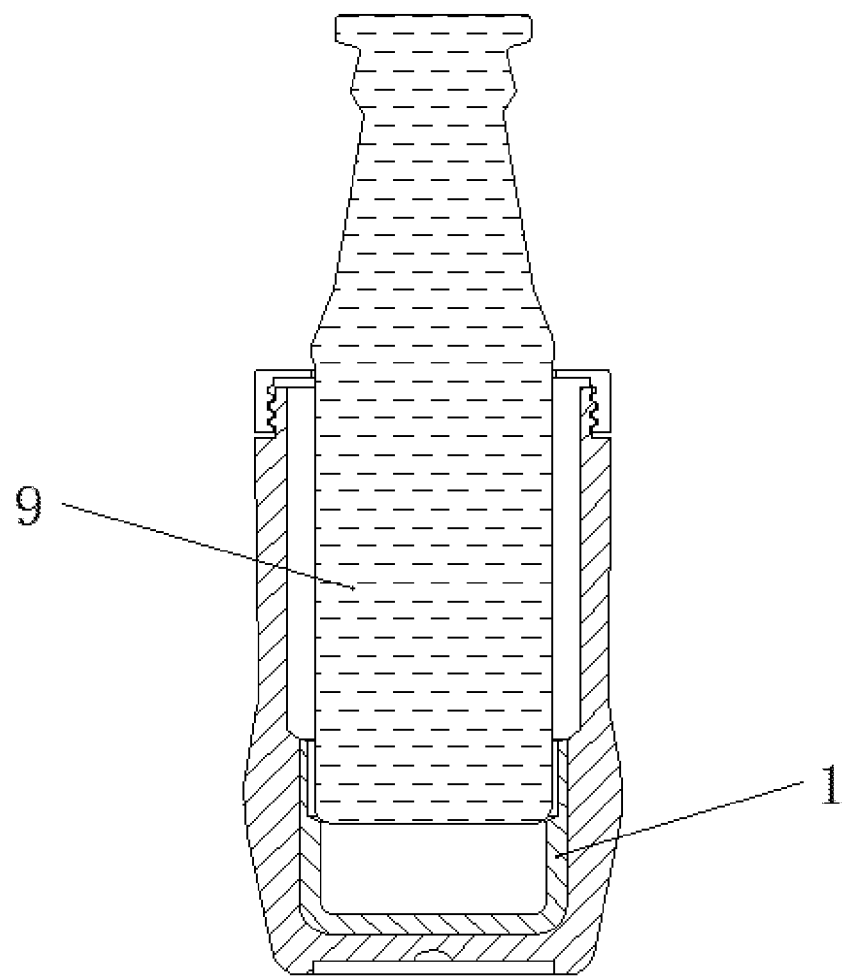
FIG. 6 is a section view of a 12 oz beer bottle main body placement structure of the multi-function fixing kit of the present utility model.
Figure 7:
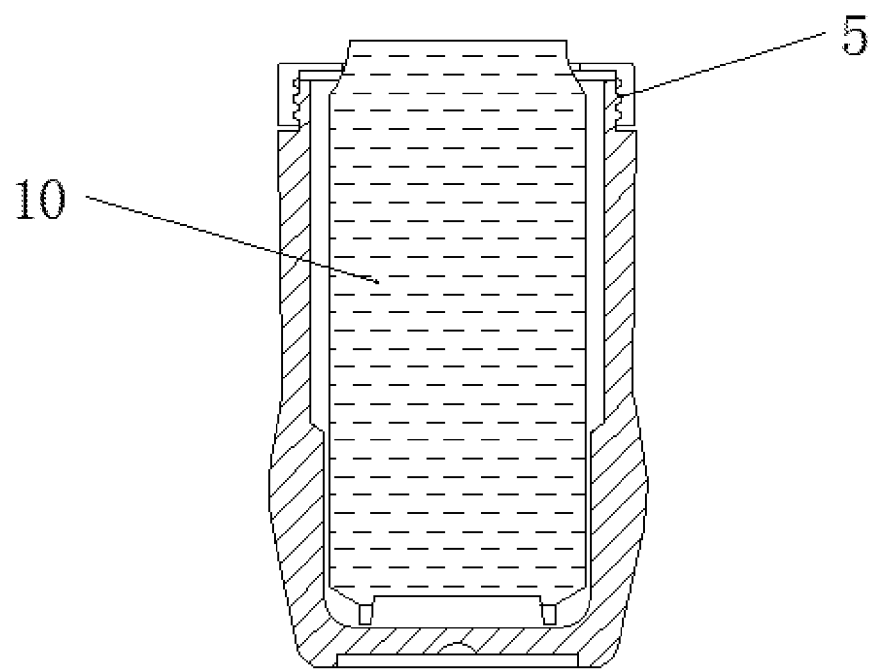
FIG. 7 is a section view of a 16 oz beverage can placement structure of the multi-function fixing kit of the present utility model.

With reference to FIGS. 1-7, an embodiment provided by the present utility model is as follows:

A multi-function fixing kit, comprises a stacking insert main body 1 and a retaining ring main body 5. A diameter of the retaining ring main body 5 is 80.5 mm. A top of the retaining ring main body 5 is provided with a through hole with a diameter of 56.5 mm. A bottom of the retaining ring main body 5 can be removably connectable with a storage container. The stacking insert main body 1 can be embedded with a storage container. The stacking insert main body 1 is divided into a first layer structure 2, and a second layer structure 3 and a third layer structure 4 from top to bottom. A top of the first layer structure 2 is removably connectable with a 12 oz beverage can main body 7, a top of the second layer structure 3 is removably connectable with a 12 oz beer bottle main body 9, a top of the third layer structure 4 is removably connectable with a 12 oz slim beverage can main body 8, and a top of a placing device is removably connectable with a 16 oz beverage can 10.

Further, the top of the retaining ring main body 5 is provided with a through hole, the retaining ring main body 5 is made of a buffer rubber elastic material, the top of the retaining ring main body 5 is an arc structure, the top of the retaining ring 2 is provided with a through hole, and the retaining ring main body 5 is made of the buffer rubber elastic material, which enhances the adaptability with the beverage container and enhances the fixing effect.

Further, the retaining ring main body 5 is provided with a fixing groove 6 inside, the bottom of the retaining ring main body 5 is movably linked with a storage container, and the retaining ring main body 5 is movably linked with a storage container, which can be applied to a variety of storage containers to fix the beverage containers, and due to movable link, it is convenient to remove and discard the finished beverage containers.

Further, a diameter of the first layer structure 2 is 66 mm, diameter of the second layer structure 3 is 62 mm, and diameter of the third layer structure 4 is 58 mm. By dividing into the layered structure, the stacking insert main body is placed at the bottom of the storage container and can be separated, which is used to lift the beverage container and fix the beverage containers of different sizes.

Further, the stacking insert main body 1 is made of an insulative material, and the bottom of the stacking insert main body 1 is an arc structure. Use of the insulative material as the material of the stacking insert main body 1 can prolong the thermal insulation effect of the beverage container, and cold beverage can be available after a long time.

Working principle: By placing the stacking insert main body 1 at the inner bottom of the storage container, and using the insulative material as the material of the stacking insert main body 1, the thermal insulation effect of the beverage container can be extended, and cold beverage is available after a long time. By placing the stacking insert main body 1 in the beverage container, dividing the stacking insert main body 1 into a multi-layer structure, separating the layers, and placing the stacking insert main body at the inner bottom of the storage container, the beverage container can be supported, and beverage containers of different sizes can be fixed. The stacking insert main body 1 is placed inside the storage container, which is convenient to take and replace the beverage containers and reduces cost. The retaining ring main body 5 is connected with the storage container through the fixing groove 6 to fix the beverage container. Owing to inlaid connection, it is convenient to remove and discard the finished beverage container. The top of the retaining ring main body 5 is an arc structure, the top of the retaining ring main body 5 is provided with a through hole, and the retaining ring main body 5 is made of a buffer rubber elastic material, which enhances the adaptability with the beverage container, and enhances the fixing effect.

It will be apparent to those skilled in the art that the present utility model is not to the details of the exemplary embodiments and can be realized by other embodiments without departing from the spirit or basic features of the present utility model. As a result, for all intents and purposes, these embodiments should be considered as being exemplary rather than restrictive. The scope of the present utility model is defined by the appended claims rather than the description above. Therefore, it is intended to include all changes fallen into the contents and scope of the equivalent essential elements of claims into the present utility model. The reference numbers in appended drawings shall not be construed as limiting related claims.

What is claimed is:

1. A multi-function fixing kit, comprising:
a stacking insert main body (1); and
a retaining ring main body (5),
wherein a diameter of the retaining ring main body (5) is 80.5 mm, a top of the retaining ring main body (5) is provided with a through hole with a diameter of 56.5 mm, a bottom of the retaining ring main body (5) is removably connectable with a storage container,
wherein the stacking insert main body (1) is placeable within the storage container, the stacking insert main body (1) having:
an exterior surface, wherein the exterior surface maintains a constant diameter from a top to a bottom of the stacking insert main body (1) and is adjacent to an inner surface of the storage container when the stacking insert main body (1) is placed in the storage container, and
an interior surface, wherein the interior surface is divided into a first layer structure (2), a second layer structure (3) and a third layer structure (4) from the top to the bottom of the stacking insert main body (1), wherein:
a top of the first layer structure (2) is removably connectable with a 12 oz beverage can main body (7),
a top of the second layer structure (3) is removably connectable with a 12 oz beer bottle main body (9),
a top of the third layer structure (4) is removably connectable with a 12 oz slim beverage can main body (8), and
a bottom wall inside the storage container is removably connectable with a 16 oz beverage can (10).

2. The multi-function fixing kit according to claim 1, wherein the top of the retaining ring main body (5) comprises a circular structure along an edge thereof, and is provided with the through hole along a center, the retaining ring main body (5) is made of an elastic material.

3. The multi-function fixing kit according to claim 1, wherein the retaining ring main body (5) is provided with a fixing groove (6) inside, and the bottom of the retaining ring main body (5) is removably connectable with the storage container.

4. The multi-function fixing kit according to claim 1, wherein a diameter of the first layer structure (2) is 66 mm, a diameter of the second layer structure (3) is 62 mm, and a diameter of the third layer structure (4) is 58 mm.

5. The multi-function fixing kit according to claim 1, wherein the stacking insert main body (1) is made of an insulative material, and a bottom edge of the stacking insert main body (1) is a circular structure.

* * * * *

UNITED STATES PATENT AND TRADEMARK OFFICE
CERTIFICATE OF CORRECTION

| | | |
|---|---|---|
| PATENT NO. | : 11,844,449 B2 | Page 1 of 1 |
| APPLICATION NO. | : 17/335183 | |
| DATED | : December 19, 2023 | |
| INVENTOR(S) | : Gu, Mammoser and Mammoser | |

It is certified that error appears in the above-identified patent and that said Letters Patent is hereby corrected as shown below:

On the Title Page

Item (12):
"Gu"

Should read:
-- Gu et al. --.

(72) Inventor:
"Weiliang Gu, Shenzhen (CN)"

Should read:
-- Weiliang Gu, Shenzhen (CN); Mitch Mammoser, Newton, IL (US); Brock Mammoser, Newton, IL (US) --.

Signed and Sealed this
Twenty-fifth Day of March, 2025

Coke Morgan Stewart
*Acting Director of the United States Patent and Trademark Office*